(12) United States Patent
Garrard

(10) Patent No.: US 11,695,356 B2
(45) Date of Patent: Jul. 4, 2023

(54) SPLIT GAIN TRANSFER FUNCTION FOR SMART MOTOR ACTUATORS

(71) Applicant: Ford Global Technologies, LLC, Dearborn, MI (US)

(72) Inventor: Mike Robert Garrard, Chelmsford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 118 days.

(21) Appl. No.: 17/063,825

(22) Filed: Oct. 6, 2020

(65) Prior Publication Data

US 2022/0109389 A1    Apr. 7, 2022

(51) Int. Cl.
*H02P 7/29*    (2016.01)

(52) U.S. Cl.
CPC ..................... *H02P 7/29* (2013.01)

(58) Field of Classification Search
CPC ... H02P 7/29; H04B 7/15578; H03G 2201/70; H03D 2200/0025
USPC .................................................... 318/400.17
See application file for complete search history.

(56) References Cited

U.S. PATENT DOCUMENTS

| 6,704,160 B2 * | 3/2004 | Takakura ............ G11B 5/59627 360/78.09 |
| 7,023,190 B2 | 4/2006 | Chapuis |
| 8,395,365 B2 | 3/2013 | Latham et al. |
| 8,907,643 B2 | 12/2014 | Sreenivas et al. |
| 10,338,669 B2 | 7/2019 | Luo et al. |
| 2013/0121047 A1 | 5/2013 | Lin |
| 2016/0344327 A1 * | 11/2016 | Lopez ............... H02P 25/034 |
| 2017/0014932 A1 * | 1/2017 | Henry ................ B23K 9/1043 |

FOREIGN PATENT DOCUMENTS

| CN | 102879354 B |   | 1/2013 |   |
| EP | 3376324 A2 | * | 9/2018 | ............. B25J 13/00 |
| JP | H06343281 A | * | 12/1994 |   |
| JP | 2007209157 A | * | 8/2007 |   |
| JP | 2013038970 A | * | 2/2013 |   |
| JP | 5225761 B2 | * | 7/2013 |   |
| WO | WO 2012101234 |   | 8/2012 |   |

OTHER PUBLICATIONS

Anzai "Conveying Apparatus, A Liquid Ejecting Apparatus, And A Transfer Method" Date Published Oct. 26, 2016 (Year: 2016).*
Ojima/Takanishi et al. (EP 3376324 A2) "Control System, Controller, and Control Method" Date Published Sep. 19, 2018 (Year: 2018).*

* cited by examiner

*Primary Examiner* — Jorge L Carrasquillo
(74) *Attorney, Agent, or Firm* — Haley Guiliano LLP

(57) ABSTRACT

The present disclosure relates to systems and methods for controlling the operation of a motor actuator for positioning a moveable element. Operational characteristics of the movable element over its operational range are determined. A first PWM signal to control the actuator over a first portion of the operational range of the movable element is generated. A second PWM signal to control the actuator over a second portion of the operational range of the movable element is generated. The first PWM signal is based on a linear transfer function having a first gain level and the second PWM signal is based on a linear transfer function having a second gain level. An output position of the moveable element is executed based the first PWM signal or the second PWM signal.

18 Claims, 7 Drawing Sheets

SPLIT GAIN TRANSFER FUNCTION FOR SMART MOTOR ACTUATORS

BACKGROUND

The present disclosure relates to the operation of an actuator system. More particularly, but not exclusively, the present disclosure relates to using a multi-gain transfer function for greater control in operating a motor actuator.

SUMMARY

Actuators, such as smart motor actuators, are well known in the field of electromechanics as a component of a machine that moves or controls a mechanism or system. Fundamentally, in order to operate, actuators require control signals and a source of energy. Actuators receive control signals and react by converting the source's energy into mechanical motion, such as torque, e.g., in order to introduce motion as well as to prevent it. Therefore, actuators can be used in various applications, such as industrial manufacturing systems, engine control systems and robotics.

The control signals used for operating an actuator can be an electric voltage, for example using Pulse-Width Modulator (PWM) signals, otherwise described as drive signals, and the main source of energy may be an electric current. The main motivation of using PWM signals as the control signal for actuators and motor actuator systems is due to its energy and power efficiency, and high precision along with noise immunity, in comparison to an analog signal.

A smart motor actuator can be defined as an integrated actuator system comprising several components. Smart motor actuators generally comprise a control unit and an actuator, the actuator having, for example, a D.C. motor, a gearbox, an output shaft and a coupled feedback sensor. Smart motor actuators are widely used across industries, particularly in engine control systems such as in the application of Exhaust Gas Recirculation (EGR) valves, wastegate actuators and exhaust gas control valves, for example.

Typically, smart motor actuators can be controlled mechanically or electronically, software-driven or human-operated, and mechanisms and systems can be operated with efficiency using communication lines between component parts which has resulted in an increase in demand for smart motor actuators across industries.

Actuators implement controllers that, when in communication with a control unit, receives signals or commands and returns diagnostic messages or other feedback data in relation to the actuator. The control unit commonly communicates with the actuator via the controller using a PWM communication line. In this way, the control signal can be both sent to and detected reliably and accurately at the controller. It is also known that similar communication schemes are also used in systems of pump control, such as auxiliary water pumps and fuel pumps, for example.

Actuator motors typically have a variable positional output range between 0% and 100%, whereas the pulse-width modulator does not use the full range of its commands, for example, at the lower and upper command limits, as they are indistinguishable from short to ground, short to battery or open circuit, as it would be understood by the skilled person.

Existing actuators, particularly smart motor actuators, operate using a single gain transfer function that defines the distribution of the PWM command range over the operational range of the actuator motor, in order to form a relationship between each PWM command and an output position of the motor. Typically, when using a single gain transfer function, the PWM may accept commands having a resolution of 1%. In other words, for every 1% increase in the PWM command the output position of the motor increases consistently at a rate, otherwise described as a gain level or factor, greater than 1%.

A single gain transfer function can result in a non-linear correlation between the PWM signals and the output positions of the motor. Therefore, motors operated by single gain transfer functions may not be capable of achieving certain target positions. The result is a discontinuity with respect to the positional increments that can be achieved by the motor.

Particularly, in applications where a more accurate or effective level of control is required, the lack of control over the positional range of the motor is not ideal and the ineffectiveness can often result in faults in the system, particularly where greater control is necessary.

In view of the foregoing, the present disclosure provides methods for operating a motor actuator and systems thereof.

In accordance with a first aspect of the disclosure, there is provided a method of operating an actuator for positioning a movable element. The method comprises determining operational characteristics of the movable element over its operational range, e.g., the operational range of motion of a valve. The method may further comprise generating a first PWM signal to control the actuator over a first portion of the operational range of the movable element, e.g., to control a first portion of the operational range that requires a lower degree of accuracy. The method may further comprise generating a second PWM signal to control the actuator over a second portion of the operational range of the movable element, e.g., to control a second portion of the operational range that requires a greater degree of accuracy. The first PWM signal can be based on a linear transfer function having a first gain level and the second PWM signal can be based on a linear transfer function having a second gain level. The method further comprises executing an output position of the moveable element based the first PWM signal or the second PWM signal, e.g., to achieve a target or desired positional output of the moveable element of the actuator.

The present disclosure results in a method that maintains overall power efficiency whilst increasing the level of control over the operational range of the actuator motor where required, thus providing a more effective method for operation that compensates for the inaccuracies that occur in existing methods of actuator operation that implement a single gain level. More particularly, by way of various examples described herein, the present disclosure seeks to overcome the limitations of existing actuator systems and methods of operating such systems by using a split gain transfer function.

In some variations, the first PWM signal is generated based on the determined operational characteristics of the moveable element at the first portion of its operational range and the second PWM signal is generated based on the determined operational characteristics of the moveable element at the second portion of its operational range.

The method disclosed herein implement a multi-gain transfer function having at least two gain levels that can be used to control different portions of the operational range of the moveable element, otherwise described as a piecewise linear transfer function, a split gain transfer function or as two or more separate linear transfer functions. E.g., the actuator may be operated with a power efficient PWM mechanism at some portions of the operational range of the moveable element, where inaccuracies are or may be allowed, whilst implementing a lower gain level at other portions of the operational range where it may be desirable to output motor positions a greater degree of accuracy or precision.

In some variations, the first gain level and the second gain level each indicate a ratio between the operational range of the moveable element and a PWM range.

In some variations, wherein at least one of the first PWM signal and the second PWM signal is further generated to control the actuator over one or more additional portions of the operational range of the movable element. E.g., depending on the application or the operational characteristics of the moveable element, it may be desired to gain greater control of the moveable element's output at the start and end portions of its operational range.

In some variations, the first gain level is greater than 1 and the second gain level is equal to 1. E.g., it may be desirable in some applications to have at least one gain level set to have a factor of 1 in order to access all output positions or increments available within the operational range of the motor.

In some variations, the method further comprises a step of receiving feedback data in relation to the moveable element from a feedback sensor coupled to the actuator. Feedback data can be communicated back to the control unit, where the control unit may respond with updated PWM commands to compensate for any internal losses incurred, for example, impacting the output position of the moveable element.

In some variations, the method further comprises a step of adjusting at least one of the first PWM signal and the second PWM signal in response to the feedback data. Using feedback data, the PWM command or PWM signal can be corrected or adjusted, e.g. dynamically or substantially instantaneously, to react with a more accurate gain level in order to achieve the desired output positions more effectively.

In some variations, the step of adjusting the at least one of the first PWM signal and second PWM signal is based on one or more vehicle parameters.

According to a second aspect, there is provided an actuator control system. The actuator control system comprises a control unit in communication with an actuator comprising a moveable element, the control unit being configured to drive the actuator. The actuator control system may further comprise means for determining operational characteristics of the movable element over its operational range. The actuator control system may further comprise means for generating a first PWM signal to control the actuator over a first portion of the operational range of the movable element, e.g., to control a first portion of the operational range that requires a lower degree of accuracy. The actuator control system may further comprise means for generating a second PWM signal to control the actuator over a second portion of the operational range of the movable element, e.g., to control a second portion of the operational range that requires a greater degree of accuracy. The first PWM signal may be based on a linear transfer function having a first gain level and the second PWM signal may be based on a linear transfer function having a second gain level. The actuator control system further comprises means for executing an output position of the moveable element based on the first PWM signal or the second PWM signal, e.g., to achieve a target or desired positional output of the moveable element of the actuator.

According to a third aspect, there is provided a vehicle comprising at least one of the actuator control systems according to the second aspect.

According to a fourth aspect, there is provided a non-transitory computer readable medium having instructions encoded thereon that when executed by control circuitry cause the control circuitry to determine operational characteristics of the movable element over its operational range, e.g., the operational range of motion of a valve. The control circuitry may be further configured to generate a first PWM signal to control the actuator over a first portion of the operational range of the movable element, e.g., to control a first portion of the operational range that requires a lower degree of accuracy. The control circuitry may be further configured to generate a second PWM signal to control the actuator over a second portion of the operational range of the movable element, e.g., to control a second portion of the operational range that requires a greater degree of accuracy. The first PWM signal may be based on a linear transfer function having a first gain level and the second PWM signal may be based on a linear transfer function having a second gain level. The control circuitry is further configured to execute an output position of the moveable element based the first PWM signal or the second PWM signal, e.g., to achieve a target or desired positional output of the moveable element of the actuator.

According to another aspect, there is provided a method of operating an actuator comprising a moveable element. The method comprises generating a PWM signal based on a linear transfer function having a first gain and a second gain.

It should be appreciated that other features, aspects and variations of the present invention will be apparent from the disclosure herein of the drawings and detailed description. Additionally, it will be further appreciated that additional or alternative examples of methods of and systems for operating actuators may be implemented within the principles set out by the present disclosure.

FIGURES

The above and other objects and advantages of the disclosure will be apparent upon consideration of the following detailed description, taken in conjunction with the accompanying drawings, in which.

The figures herein depict various examples of the disclosure's invention for purposes of illustration only. It shall be appreciated that additional or alternative structures, systems and methods may be implemented within the principles set out by the present disclosure.

DETAILED DESCRIPTION

Figure 1:
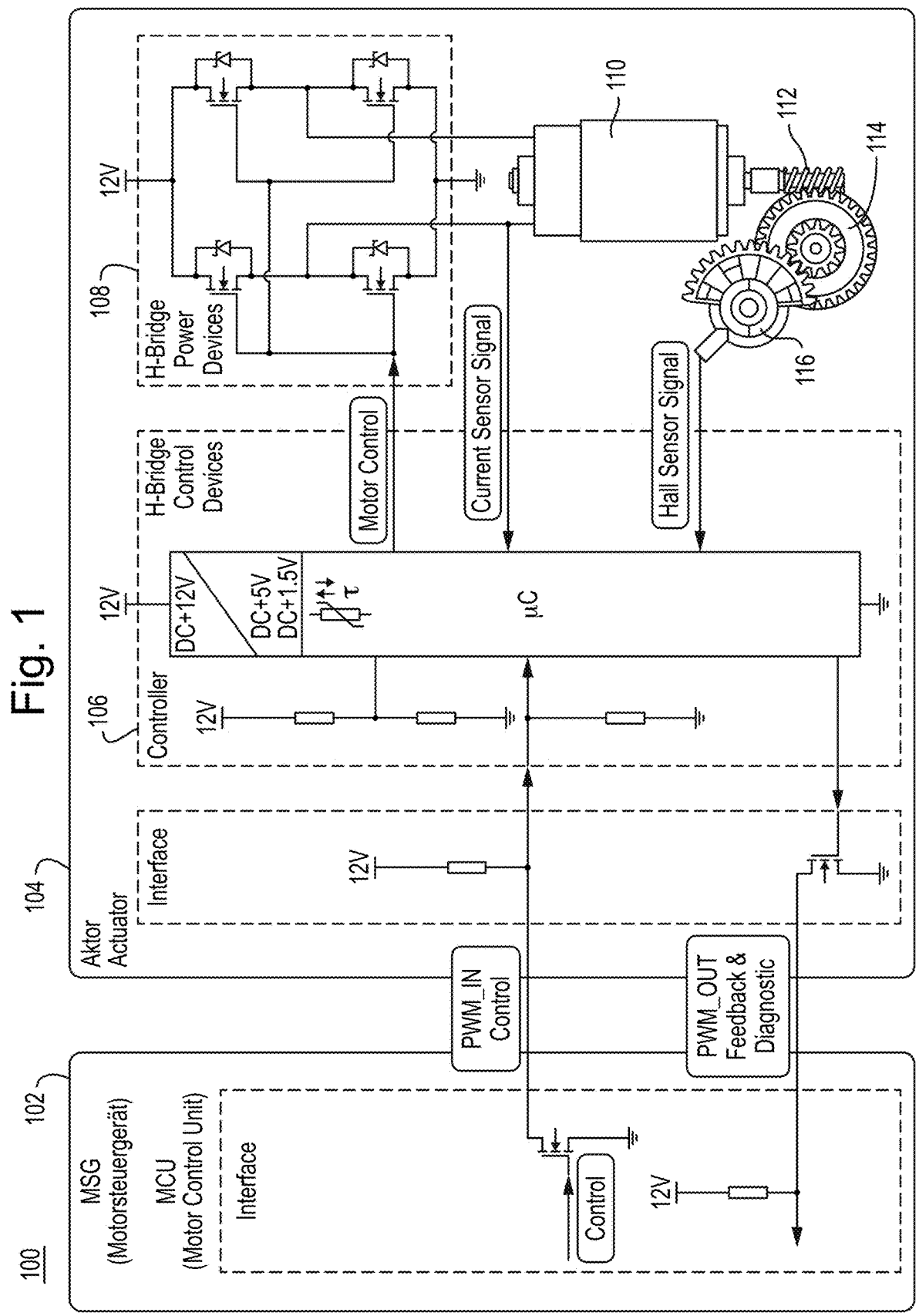
FIG. 1 illustrates a circuit diagram for an actuator system in accordance with example examples of the present disclosure.

With reference to FIG. 1, an example structure of an actuator system 100 of the present disclosure will now be described.

In the example of FIG. 1, an actuator system 100, or smart motor actuator system, is an integrated actuator 104 and control unit 102 system comprising several components including, but not limited to, a motor (A.C. or D.C.) 110, an output shaft (linear or rotary) 112, a controller 106 such as a microcontroller, gears 114 or gearboxes, sensors or feedback sensors 116 such as a current sensor or a hall sensor, one or more communication lines for transmitting signals and an amplifier 108.

In some examples, the control unit 102 can be in communication with the actuator 104. More specifically, the control unit 102 is capable of transmitting, over the communication line, an electric current such as a PWM signal corresponding to the desired output position of the motor 110, more specifically the position of the output shaft 112 (e.g., the output shaft of the gear segment, the final drive). The PWM signal can be transmitted to the microcontroller 106 within the actuator system 100 where the PWM signal can be converted to an operational motion to be output at the motor 110 to achieve the desired output position as indicated by sensor 116.

In some examples, once a desired output motor position is determined, at the actuator 104, within an operational or executable positional range of the motor 110, a corresponding PWM command can be determined within a PWM range accordingly. In turn, the control unit 102 converts the corresponding PWM command into a variable digital PWM signal that can be output using a PWM, otherwise described as a wave generator or a pulse generator, comprised within the control unit 102.

Actuator systems 100 commonly have one or more sensors or feedback sensors 116 coupled to the actuator 104 or to the motor 110, e.g., such as a hall sensor or a current sensor. Feedback sensors 116 are capable of communicating a feedback signal to the control unit 102 via the microcontroller 106. The feedback sensor 116 may be capable of detecting data in relation to the motor 110 or the gearset output shaft such as, for example, position data, diagnosis data or PWM signal errors.

In some examples, feedback data can be monitored at the control unit 102 to determine an offset between the actual output position of the motor and the initial PWM command or the PWM signal transmitted to the actuator 104. In some examples, the feedback data can be used to adjust, correct the PWM signal when determining subsequent PWM commands in an attempt to compensate for any errors detected by the feedback sensor 116. Error correction may be dynamic for example.

It shall be appreciated that there are many forms of feedback sensors 116 or feedback control systems as well as many variations of pulse width modulating circuitry are readily available in the field of electromechanics for use in smart motor actuators 100 of described examples.

Figure 2:
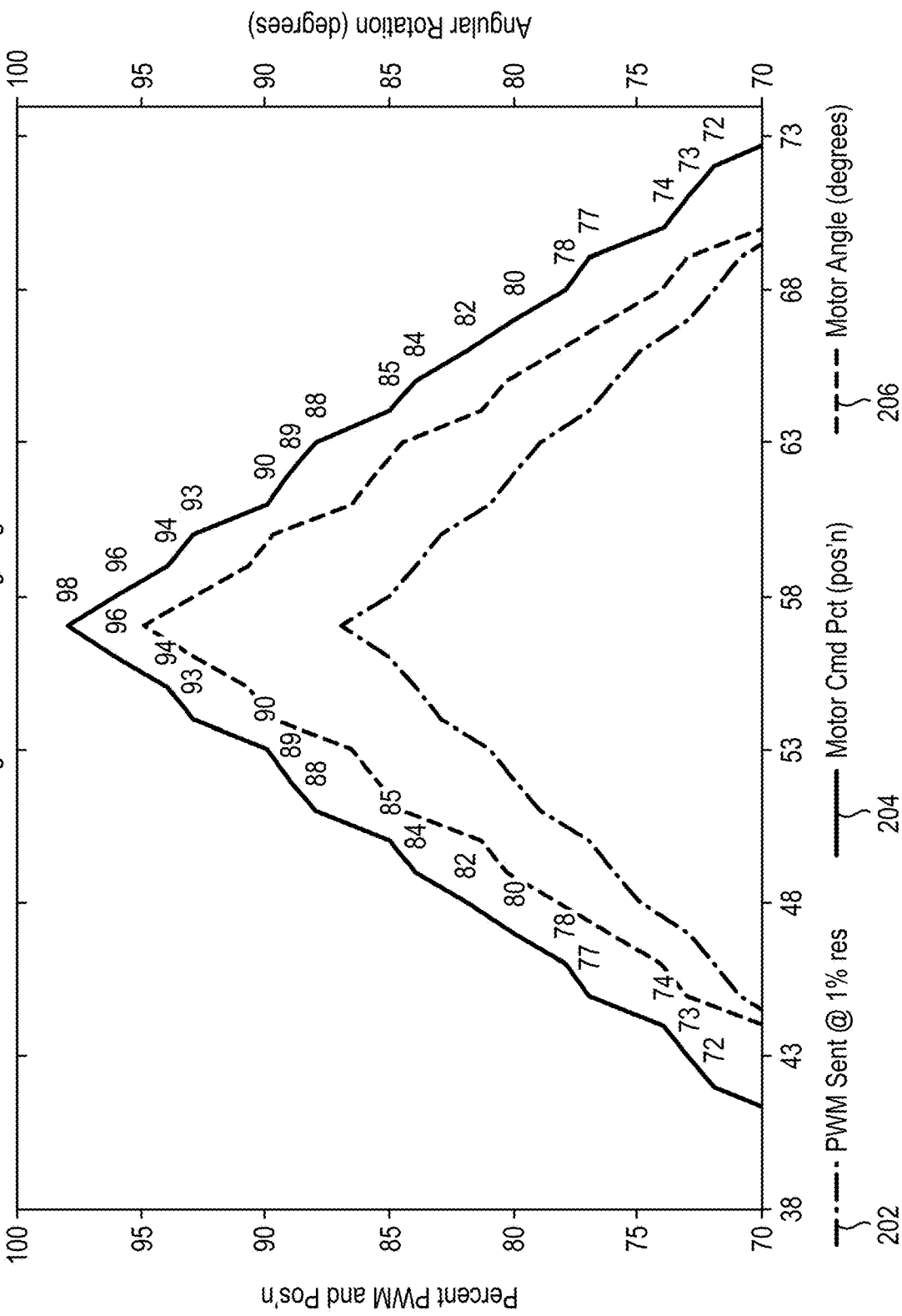
FIG. 2 shows an example graph depicting the relationship between the commanded output positions and the actual output positions of the motor using a single gain transfer function.

With reference to FIG. 2, known methods of operating actuators, particularly smart motor actuators, will now be described. More specifically, FIG. 2 shows an example graph depicting the relationship between the commanded output positions and the actual output positions of the motor at each step in the PWM command range in conventional systems that employ a single gain level transfer function.

For the operation of actuators, the relationship between the desired output motor position and its corresponding PWM command can be defined using a transfer function. In conventional actuator systems, one linear transfer function having a single gain level in the form y=mx+c is generally implemented, correlating the desired output position to the required PWM command and vice versa.

Actuator motors tend to have an operational range of 0% and 100%, whereas, the PWM command commanding the PWM signal to be generated does not make use of the full range of commands that are available. For example, at the lower and upper limits of the PWM range, the PWM signals produced are indistinguishable from short to ground, short to battery, or open circuit, as it would be understood by the skilled person.

In operating actuator systems, the PWM command range is distributed evenly over the operational range of the actuator motor. Therefore, by implementing a single gain transfer function, there may be inevitably fewer 1% steps available as true operational positions than the full 0% to 100% operational range of the motor. This can create an offset between the PWM command range and the operational range of the motor's position. Thus, in actuator systems, where for example the resolution of the PWM command is typically set at 1%, a 1% increase to the PWM command translates to an increase greater than 1% to the output position of the motor.

The PWM command resolution is a function of a timer within the microcontroller 106, which requires a resolution notably smaller than 1% in order to discriminate between each of the 1% PWM command steps. Thus, low cost microcontrollers tend to have a timer with channels of fewer bits resulting in limited resolution levels and may be unsuitable for applications requiring high levels of accuracy. Whereas, in more advanced or higher quality microcontrollers, it may be possible to achieve a resolution of less than 1%.

In FIG. 2, three variables are illustrated. Namely, the PWM commands sent at 1% resolution 202, corresponding commanded motor positions 204, and the output motor angles in degrees 206. In the example of FIG. 2, for example, the PWM only produces signals within a PWM command range of 75%, from 12.5% to 87.5%, to control the operational output of the motor. In this example, the result is a gain level that is greater than 1%, more specifically 1.333%. Putting this into context, for each 1% step in the PWM command range, the motor's output position is set to consistently increase or decrease by 1.333% of its operational range.

In conventional methods, applying a single gain transfer function as described in the example above results in limitations in the operation of actuator systems, mainly due to a lack of control over the motor. The limitation is specifically affected by the discontinuity wherein not all of the individual 1% steps or increments of the operational range of the motor are available as true operational outputs. E.g., in some portions of the operational range of the motor, the discontinuity may result is a non-linear behavior in relation to the change in the motor's positional output. Such systems may not be capable of reaching certain target positions accurately and may prove to be ineffective.

Due to the 1% resolution of the PWM command range, the output position is likely to be either rounded down, up or simply truncated producing positional gaps between subsequent positions that can be achieved by the system within the operational range of the motor. This is represented as ripples in FIG. 2, representing the lack of true operational output positions of the motor within its operational range due to the single linear transfer function as described above.

Figure 3:
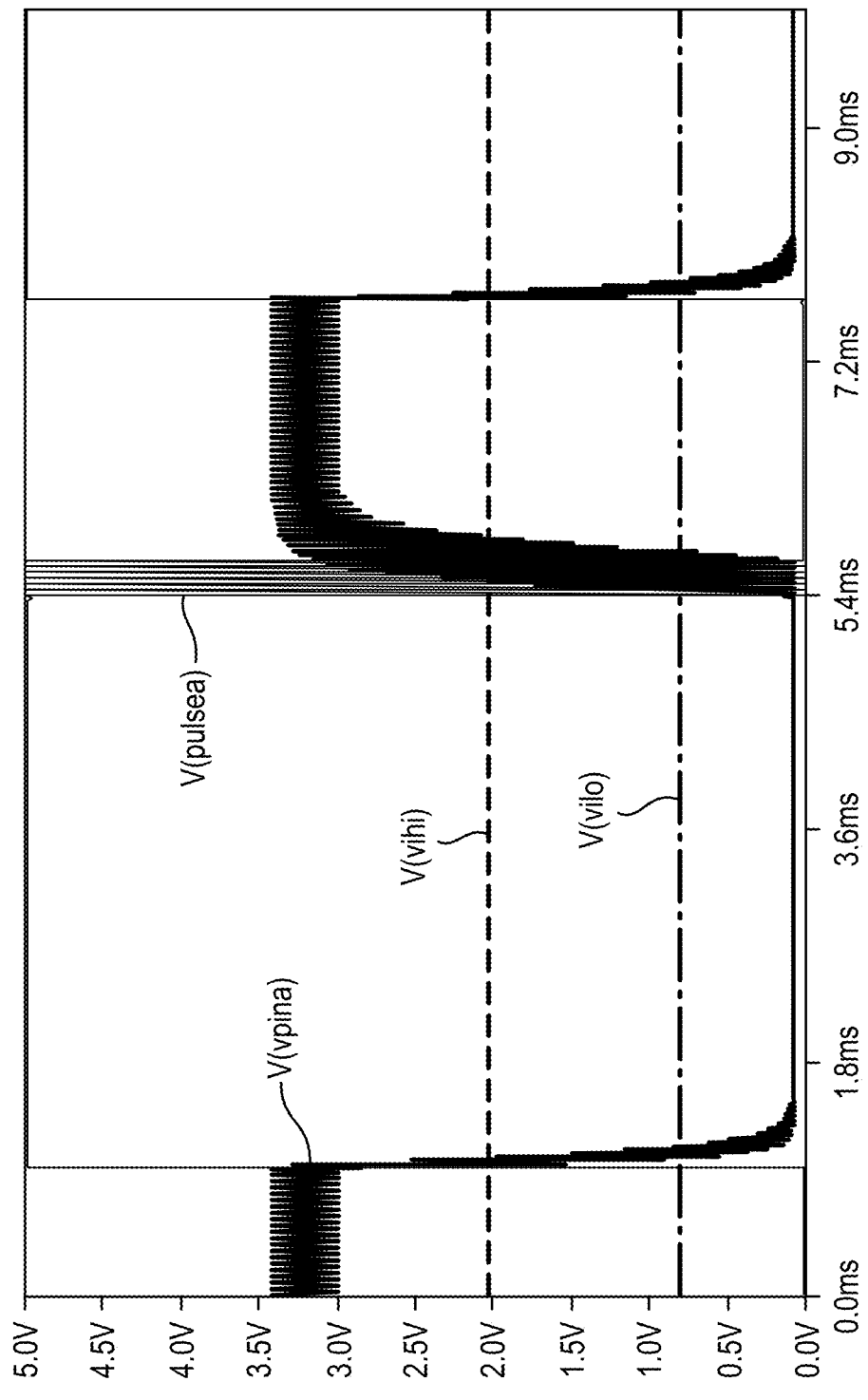
FIG. 3 shows an illustration of the signal losses at edges of the PWM duty cycle due over time.

Furthermore, as shown in FIG. 3, during the operation of actuators there may be additional contributions of error or limitations. One example of such contributions includes, e.g., signal losses as the PWM signal is transmitted from the control unit to the microcontroller at the actuator.

Illustration 300 shown in FIG. 3 shows an example where the edges of the PWM signal are seen to incur losses over time. This may be due to, e.g., EMC capacitors at both ends of the communication line causing inaccuracies to the received PWM signal at the microcontroller, for example, as the capacitance value drifts with temperature and time. Such errors may amount to an unwanted offset between the desired and actual output positions of the motor, which may result in an undesirable level of noise.

Other parameters that might affect the operation of smart motor actuators may include, but is not limited to, e.g., further internal signal losses, signal to noise ratio and size or cost of component parts.

Single gain transfer functions are therefore only adequate in systems where precise control is not required or is not necessary, or if the level of control required is constant for complete and effective operation, for example. For example, it may be the case that mid-positional sub-ranges do not require accurate positioning of the motor and does not result in faults. However, this may not be the case at more particular regions or sub-ranges, typically at end limits of the transfer function, where inaccuracies in output motor positions may be detrimental and may affect the operation of the actuator system.

In applications of high-performance motion control systems or those that require a degree of precision or control for effective and reliable operation, it is desirable to be able to achieve accurate levels of positional output using PWM commands. For some actuators, for example gas valves, the last few steps of closure are critical and discontinuity in output motor positions caused by single gain transfer functions cause degraded control. For example, an exhaust butterfly valve used to generate backpressure for exhaust gas recirculation in engine control systems has its' greatest effect just as it closes and therefore it would be ideal to be able to achieve greater control over the closing positions of the valve.

Such applications may require a linear or substantially linear gain level at particular regions or segments of the operational range of the motor, which is not possible using a single gain transfer function. This can be particularly true for the lower and upper limits of the operational range of the motor, where a valve requires careful opening and closing for example. In other applications, certain positions may require acceleration or deceleration or may require a varied force to be applied, for example. It can be said that conventional methods employing single gain level transfer functions are not suitable for such applications.

Figure 4:
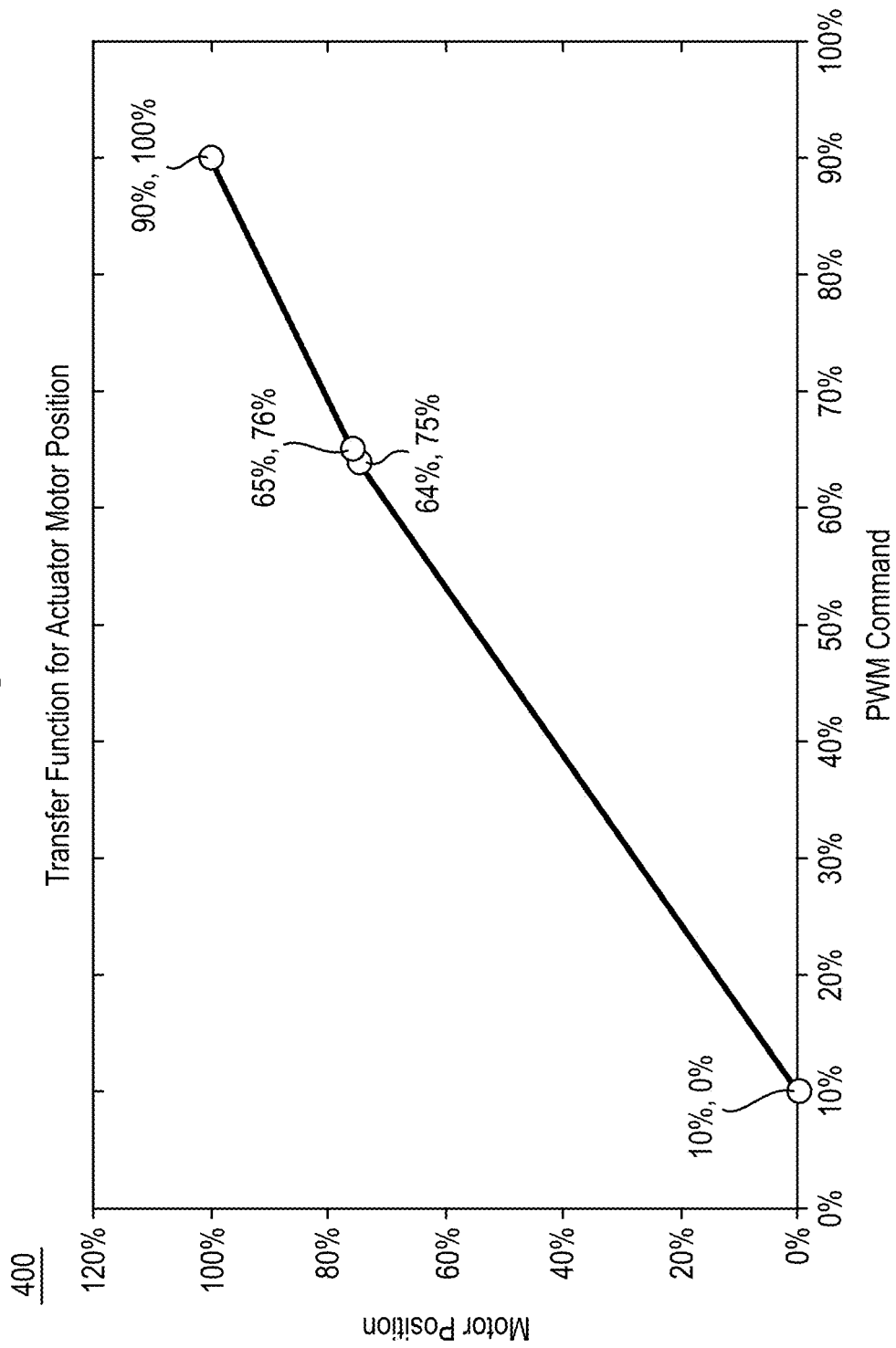
FIG. 4 shows a graph illustrating an example piecewise transfer function depicting a change in the positional output of the motor over the full range of PWM commands using a multi-gain transfer function.

With reference to FIG. 4, some examples of the present disclosure will now be described. More particularly, FIG. 4 shows a graph illustrating an example piecewise transfer function depicting a change in the positional output of the motor over the full range of PWM commands using two gain levels.

Knowledge of system parameters and the impact of controlling such parameters can be used as an indication as to which sections of the transfer function should provide tighter control, for example. In this way, a multi-gain transfer function can be used to develop systems and methods of the present disclosure, and to overcome the shortcomings of single gain methods and system.

More specifically, some examples implement a multi-gain transfer function that defines two or more segments of distribution of the PWM command range and the operational range of the motor to determine the PWM signal that is required. By implementing a multi-gain transfer function, the gain level may be set high for sub-ranges or portions of the operational range of the motor where the controlled actuator effect is not critical. Similarly, the gain level may be set to be low or substantially linear in regions or portions of the operational range of the motor where precise control is required.

In the example transfer function of FIG. 4, the control range of 10% to 90% can be split into two range segments requiring different levels of control. As shown in FIG. 4, from PWM commands 10% to 65%, the actuator position gain level is 1.3636% for every 1% of the PWM command in moving the valve position from 0% to 75%. This results in missed steps only where accurate positions are not essential for the effective control of the valve. From 66% to 90% of the PWM command range, however, the stepwise movement of the motor can be 1% for every 1% PWM command in moving the valve position from 76% to 100%, having a linear correlation and thus a great level of control in accessing all positions available within the final 25% of the positional range of the valve. This results in a method capable of achieving all possible output motor positions during the critical phases of the motor. For example, the method may comprise controlling the position of the valve over first range segment using a first linear transfer function and the position of the valve over second range segment using a second linear transfer function. The first linear transfer function may correspond to valve positions from "open" to "~75% closed" and the second linear transfer function may correspond to valve positions from "~75% closed" to "closed". For example, the first linear transfer function may be:

$$\text{Valve position } [\%] = \left(\frac{76}{56}\right) * (PWM \ [\%] - 10 \ [\%]),$$

and the second linear transfer function may be: Valve position[%]=PWM [%]+10[%].

In some examples, the piecewise transfer function may be determined using the following steps, by: acknowledging the operational range of the motor; acknowledging the PWM command range; determining one or more sub-ranges or segments of the operational range of the motor where tighter control may be required; determining one or more gain levels required at the determined sub-ranges where tighter control may be required; applying the knowledge of the gain levels required and corresponding sub-ranges in order to determine the distribution of the PWM command range over the operational range of the motor position; defining a piecewise transfer function having at least two different gain levels, wherein the remaining operational range of the motor is subject to a gain level of that defined by the distribution.

Figure 5:
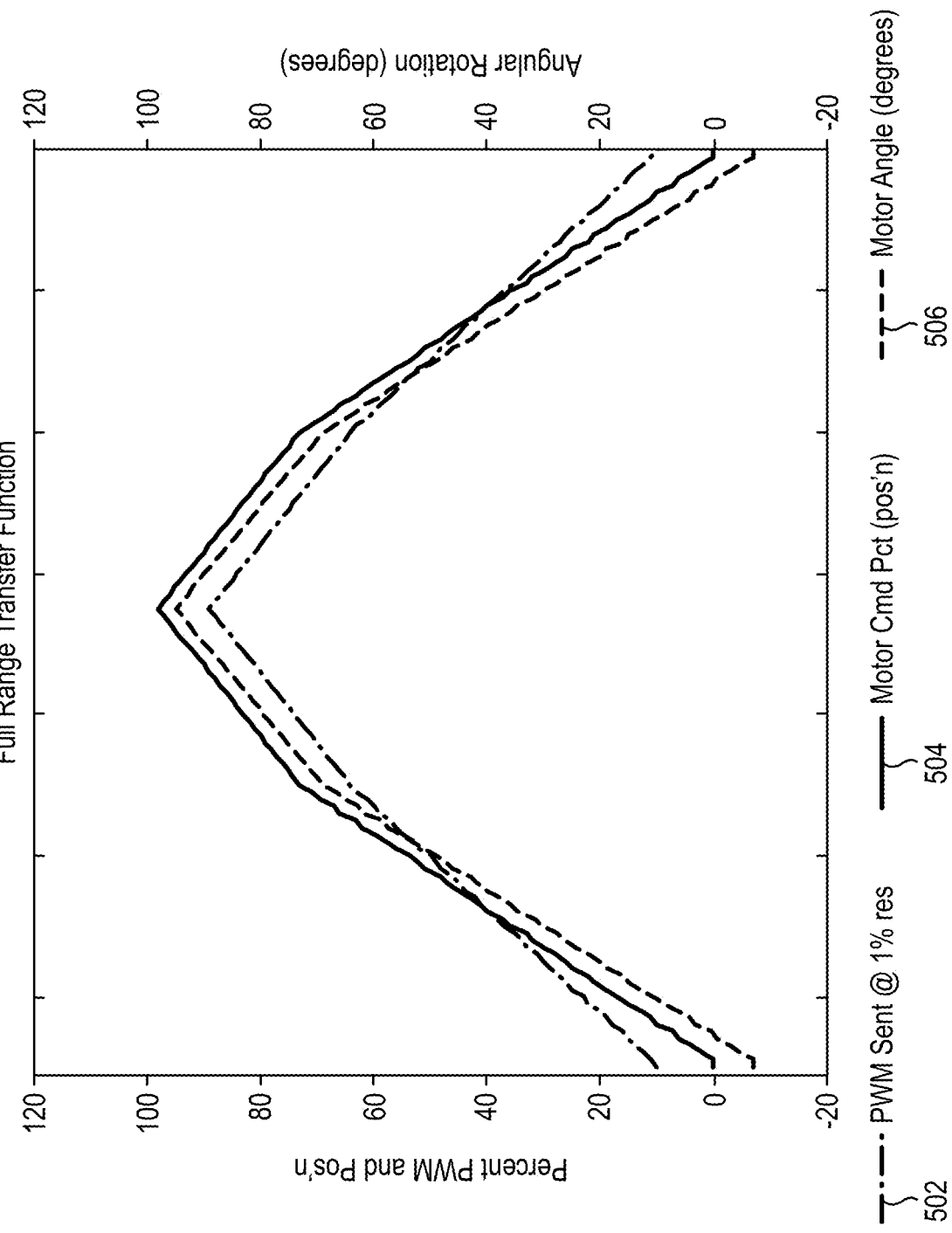
FIG. 5 shows a plotted view of the example piecewise transfer function that has been modelled according FIG. 4.

With reference to FIG. 5, a plotted view of the example implementation of the piecewise transfer function according FIG. 4 will now be described. More particularly, FIG. 5 shows a graph 500 depicting the relationship between the commanded and actual output positions of the motor over the full range of PWM commands, using the piecewise transfer function shown in FIG. 4.

In FIG. 5, three variables are illustrated. Namely, the PWM commands sent at 1% resolution 502, corresponding commanded motor positions 504, and the output motor angles in degrees 506. In this example, there is a high gain segment from 0% to 75% that can be seen to miss steps in the positional range of the motor. Additionally, there is a low gain segment from 76% to 100% depicting a linear gain level where accurate control of the system can be obtained.

In some examples, in order to achieve tighter control, the gain level of the PWM command to the actuator output position can be arranged to be a ratio of 1:1, for example. Where it is acceptable for control can be less tight, a greater or higher gain level may be allowed in order to access the full range of positions operational by the motor, for example using a ratio of 1.7:1. Commonly, the tight control of the motor may be required at one end or both ends of the transfer function. If at both ends, for example, then the gain levels may be represented as a ratio of 1:1 to 1.7:1 to 1:1 as the PWM command increases from its lowest value.

Figure 6:
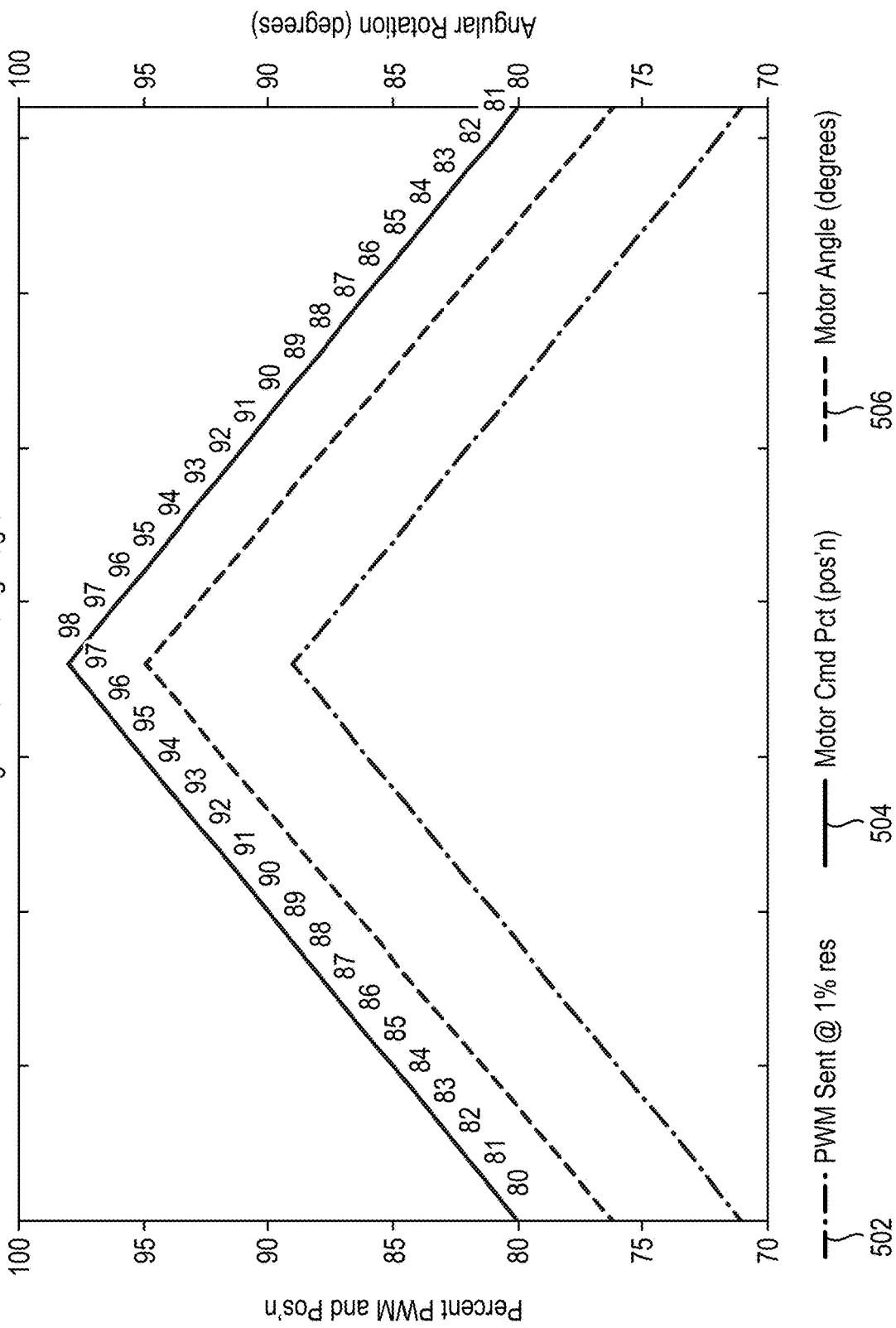
FIG. 6 shows an exploded view of the linear gain level portion as shown in FIG. 5.

With reference to FIG. 6 shows an exploded view 600 of the operational range portion controlled by a linear gain level as shown in FIG. 5. More specifically, this region depicts the linear relationship between the commanded and actual output positions of the motor at each PWM command.

Examination of the commanded PWM positions shows linearity across the positions of the motor output within said operational range portion. In example examples, the same transfer function in reverse can be used provide a closed loop control of the moveable element of the actuator. This allows for fine control that may be required, e.g., due to backpressure in exhaust butterfly valves.

Actuator systems 100 often comprise feedback sensors 116 coupled to the actuator 104 or the motor 110 which are configured to transmit or communicate feedback data to the control unit 102. The feedback data, e.g., may relate to PWM modulation error, pose information of the motor or diagnosis data.

In some examples, the control unit 102 implementing a multi-gain level transfer function to output desired PWM signals may be capable of altering, correcting or adjusting the PWM signal in order to achieve the desired motor positions efficiently and effectively. The adjustments may be made dynamically or in substantially real-time for example. The control unit 102 may use feedback data received from the feedback sensor to determine whether to adjust the PWM signal in order to achieve the desired output positions of the motor 110.

In some examples, the control unit 102 may compensate for signal errors that occur during the transmittance of PWM signals. In some examples, e.g., the signal corresponding to the actual output of the motor 110 can be fed back to the control unit 102 where it can be superimposed or compared to the initial PWM signal that was sent to drive the motor 110. In this way, the actuator system 100 may be able to compensate for errors or offsets using subsequent PWM signals that are transmitted.

In some examples, the control unit 102 may be further capable of altering, correcting or adjusting the PWM signal based on one or more predetermined logic conditions relating to feedback data and/or one or more vehicle parameters. The control unit 102 may be configured to receive feedback data and/or one or more vehicle parameters and assess the variable data to determine the PWM signal.

Although FIG. 1 shows the example actuator control system 100 as including a number and configuration of individual components, in some examples, any number of the components of system 100 may be combined, programmed to be in communication with, and/or integrated as modules for example. The actuator system 100 may include component parts or modules each of which can be communicatively coupled to any suitable communication protocol or network.

In some examples, any suitable alternative communication line may be used for the communication between the control unit 102 and the actuator 104, for example in order to transmit PWM signals from the control unit 102 to the actuator 104 as well as receiving feedback data from the feedback sensor 116 at the control unit 102. Some examples of communication protocols that may be implemented as part of such actuators 100 as described herein include, but is not limited to, single wire PWM grounding protocols, standard CAN communication protocols or standard LIN communication protocols, for example.

Figure 7:
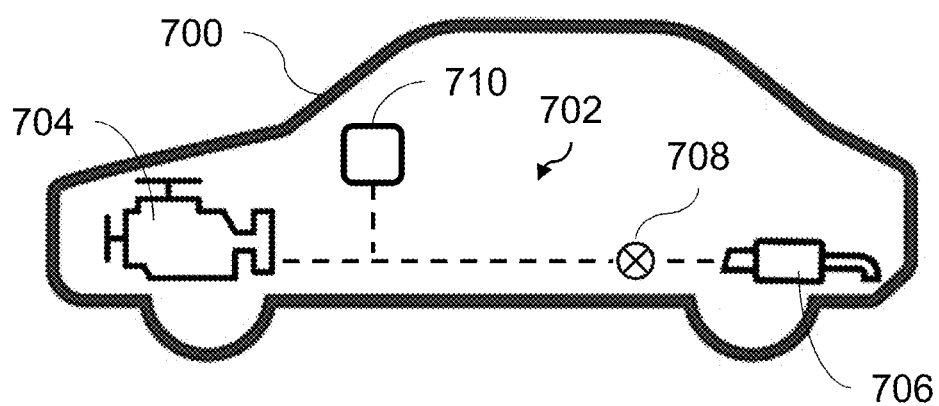
FIG. 7 is a schematic showing a vehicle comprising an exemplary actuator control system, in accordance with some examples of the disclosure.

FIG. 7 shows a vehicle 700 comprising an actuator control system 702, in accordance with some examples of the disclosure. In the example shown in FIG. 7, the vehicle 700 comprises an engine 704, an exhaust system 706 and actuator 708 configured to control the flow of exhaust gases through the exhaust system 706, e.g., by moving a moveable element of an exhaust gas flow valve. Control unit 710, e.g., microcontroller 106, is in operable communication with engine 704, e.g., by virtue of an engine control module, exhaust system 706, e.g., by virtue of an exhaust control module, and actuator 708, e.g., by virtue of an actuator control module. Control unit 710 is configured to carry out one or more of the above disclosed methods to control a position of the moveable element based at least one of a first PWM signal or a second PWM signal, as described above. Whilst the example shown in FIG. 7 relates to controlling the operation of a flow control valve of an exhaust system, it is to be understood that the present disclosure may relate to the control and/or actuation of any appropriate moveable element, and in particular, but not exclusively, to the control and/or actuation of a moveable element of a vehicular system, e.g., based upon one or more operational characteristics of the moveable element and/or the vehicle.

Figure 8:
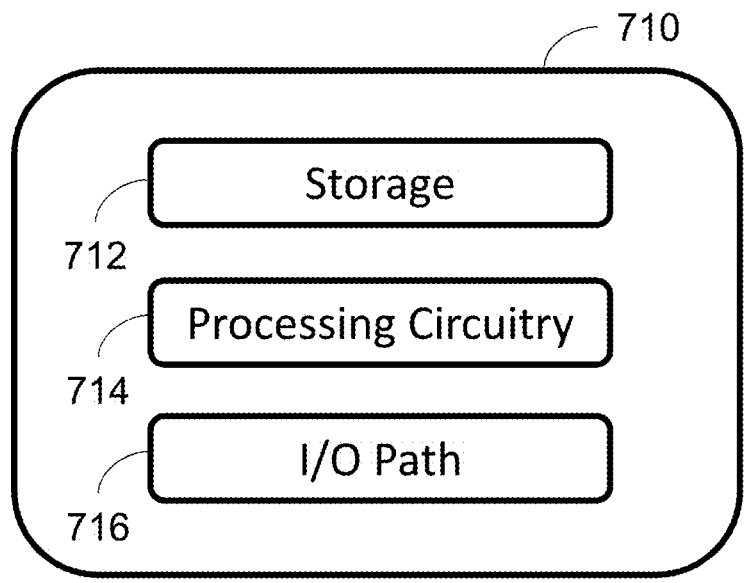
FIG. 8 is a block diagram showing exemplary control circuitry, in accordance with some examples of the disclosure.

FIG. 8 shows an exemplary block diagram of control unit 710. Control unit 710 includes storage 712, processing circuitry 714 and I/O path 716. Control unit 710 may be based on any suitable processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor).

Storage 712, and/or storages of other components of actuator control system 702 may be an electronic storage device. As referred to herein, the phrase "electronic storage device" or "storage device" should be understood to mean any device for storing electronic data, computer software, or firmware, such as random-access memory, read-only memory, hard drives, and the like, and/or any combination of the same. In some examples, control unit 710 executes instructions for an application stored in memory (e.g., storage 712). Specifically, control unit 710 may be instructed by an application to perform the methods/functions discussed herein.

Control unit 710 may be configured to transmit and/or receive data via I/O path 716. For instance, I/O path 716 may include a communication port(s) configured to transmit and/or receive data from at least one of an engine control module, an actuator control module and a vehicular system control module, such as an exhaust system control module.

The disclosure of this invention is made for the purpose of illustrating the general principles of the systems and processes discussed above and are intended to be illustrative rather than limiting. More generally, the above disclosure is meant to be exemplary and not limiting and the scope of the invention is best determined by reference to the appended claims. In other words, only the claims that follow are meant to set bounds as to what the present disclosure includes.

While the present disclosure is described with reference to particular example applications, shall be appreciated that the invention is not limited hereto. It will be apparent to those skilled in the art that various modifications and improvements may be made without departing from the scope and spirit of the present invention. Those skilled in the art would appreciate that the actions of the processes discussed herein may be omitted, modified, combined, and/or rearranged, and any additional actions may be performed without departing from the scope of the invention.

Any system feature as described herein may also be provided as a method feature and vice versa. As used herein, means plus function features may be expressed alternatively in terms of their corresponding structure. It shall be further appreciated that the systems and/or methods described above may be applied to, or used in accordance with, other systems and/or methods.

Any feature in one aspect may be applied to other aspects, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects can be implemented and/or supplied and/or used independently.

The invention claimed is:

1. A method of operating an actuator for positioning a movable element, the method comprising:
   determining operational characteristics of the movable element over its operational range of motion;
   generating a first PWM signal to control the actuator over a first portion of the operational range of motion of the movable element;
   generating a second PWM signal to control the actuator over a second portion of the operational range of motion of the movable element, wherein:
      the first PWM signal is based on a linear transfer function having a first gain level and the second PWM signal is based on a linear transfer function having a second gain level, and
      the first portion of the operational range of motion requires a lower degree of accuracy than the second portion of the operational range of motion;
   executing an output position of the movable element based the first PWM signal or the second PWM signal; and
   determining a distribution of a piecewise linear transfer function, the distribution describing:
      (a) the first gain level over the first portion of the operational range of motion,
      (b) the second gain level over the second portion of the operational range of motion, and
      (c) the remaining operational range of motion of the movable element is subject to a third gain level of that defined by the distribution.

2. The method of claim 1, wherein the first PWM signal is generated based on the determined operational characteristics of the movable element at the first portion of its operational range of motion and the second PWM signal is generated based on the determined operational characteristics of the movable element at the second portion of its operational range of motion.

3. The method of claim 1, wherein the first gain level and the second gain level each indicate a ratio between the operational range of motion of the movable element and a PWM range.

4. The method of claim 1, wherein at least one of the first PWM signal and the second PWM signal is further generated to control the actuator over one or more additional portions of the operational range of motion of the movable element.

5. The method of claim 1, wherein the first gain level is greater than 1 and the second gain level is equal to 1.

6. The method of claim 1, further comprising a step of receiving feedback data in relation to the movable element's position from a feedback sensor coupled to the actuator.

7. The method of claim 6, further comprising a step of adjusting at least one of the first PWM signal and the second PWM signal in response to the feedback data.

8. The method of claim 7, wherein the step of adjusting the at least one of the first PWM signal and second PWM signal is based on one or more vehicle parameters.

9. An actuator control system comprising a control unit in operable communication with an actuator for positioning a movable element, the control unit being configured to:
   determine one or more operational characteristics of the movable element over its operational range of motion;
   generate a first PWM signal to control the actuator over a first portion of the operational range of motion of the movable element;
   generate a second PWM signal to control the actuator over a second portion of the operational range of motion of the movable element, wherein:
      the first PWM signal is based on a linear transfer function having a first gain level and the second PWM signal is based on a linear transfer function having a second gain level, and
      the first portion of the operational range of motion requires a lower degree of accuracy than the second portion of the operational range of motion; and
   execute an output position of the movable element based the first PWM signal or the second PWM signal; and
   determining a distribution of a piecewise linear transfer function, the distribution describing:
      (a) the first gain level over the first portion of the operational range of motion,
      (b) the second gain level over the second portion of the operational range of motion, and
      (c) the remaining operational range of motion of the movable element is subject to a third gain level of that defined by the distribution.

10. The actuator control system of claim 9, wherein the control unit is configured to generate the first PWM signal based on the determined operational characteristics of the movable element at the first portion of its operational range of motion and the second PWM signal based on the determined operational characteristics of the movable element at the second portion of its operational range of motion.

11. The actuator control system of claim 9, wherein the first gain level and the second gain level each indicate a ratio between the operational range of motion of the movable element and a PWM range.

12. The actuator control system of claim 9, wherein the control unit is configured to generate at least one of the first PWM signal and the second PWM signal to control the actuator over one or more additional portions of the operational range of motion of the movable element.

13. The actuator control system of claim 9, wherein the first gain level is greater than 1 and the second gain level is equal to 1.

14. The actuator control system of claim 9, wherein the control unit is configured to receive feedback data in relation to the movable element's position from a feedback sensor coupled to the actuator.

15. The actuator control system of claim 14, wherein the control unit is configured to adjust at least one of the first PWM signal and the second PWM signal in response to the feedback data.

16. A vehicle comprising the actuator control system of claim 9.

17. The vehicle of claim 16, comprising means for adjusting at least one of the first PWM signal and second PWM signal based on one or more vehicle parameters.

18. A non-transitory computer readable medium having instructions encoded thereon that when executed by control circuitry cause the control circuitry to:
  determine operational characteristics of the movable element over its operational range of motion;
  generate a first PWM signal to control an actuator over a first portion of the operational range of motion of the movable element;
  generate a second PWM signal to control the actuator over a second portion of the operational range of motion of the movable element, wherein:
    the first PWM signal is based on a linear transfer function having a first gain level and the second PWM signal is based on a linear transfer function having a second gain level, and
    the first portion of the operational range of motion requires a lower degree of accuracy than the second portion of the operational range of motion;
  execute an output position of the movable element based the first PWM signal or the second PWM signal; and
  determine a distribution of a piecewise linear transfer function, the distribution describing:
    (a) the first gain level over the first portion of the operational range of motion,
    (b) the second gain level over of the second portion of the operational range of motion, and
    (c) the remaining operational range of motion of the movable element is subject to a third gain level of that defined by the distribution.

* * * * *